(12) United States Patent
Gardell et al.

(10) Patent No.: US 6,707,797 B1
(45) Date of Patent: Mar. 16, 2004

(54) MULTI-LINE TELEPHONY VIA NETWORK GATEWAYS

(75) Inventors: Steven E. Gardell, North Andover, MA (US); Barbara Mayne Kelly, Concord, MA (US); Israel B. Zibman, Newton, MA (US)

(73) Assignees: Verizon Corporate Services Group Inc., New York, NY (US); Genuity, Inc., Burlington, MA (US)

( * ) Notice: Subject to any disclaimer, the term of this patent is extended or adjusted under 35 U.S.C. 154(b) by 0 days.

(21) Appl. No.: 09/177,712

(22) Filed: Oct. 23, 1998

(51) Int. Cl.[7] .......................... H04L 12/16; H04Q 11/00
(52) U.S. Cl. ...................... 370/260; 370/261; 370/263; 370/264; 370/271; 370/352; 370/396; 379/158; 379/187
(58) Field of Search ................... 370/260, 261, 370/263, 264, 271, 352, 396; 379/156, 158, 182, 187, 202

(56) References Cited

U.S. PATENT DOCUMENTS

| | | | | |
|---|---|---|---|---|
| 4,360,910 A | * | 11/1982 | Segal et al. | 370/62 |
| 5,247,347 A | * | 9/1993 | Litteral et al. | 358/85 |
| 5,541,917 A | * | 7/1996 | Farris | 370/60.1 |
| 5,583,920 A | | 12/1996 | Wheeler, Jr. | 379/88 |
| 5,592,477 A | * | 1/1997 | Farris et al. | 370/396 |
| 5,594,789 A | | 1/1997 | Seazholtz et al. | 379/207 |
| 5,790,173 A | | 8/1998 | Strauss et al. | 348/7 |
| 5,790,548 A | | 8/1998 | Sistanizadeh et al. | 370/401 |
| 5,909,431 A | | 6/1999 | Kuthyar et al. | 370/260 |
| 6,049,531 A | * | 4/2000 | Roy | 370/260 |
| 6,101,182 A | * | 8/2000 | Sistanizadeh et al. | 370/352 |
| 6,141,339 A | * | 10/2000 | Kaplan et al. | 370/352 |

OTHER PUBLICATIONS

Labriola, Don, "Here's Looking at You," Computer Shopper, Sep. 1997, p. 335–362.

* cited by examiner

Primary Examiner—Hassan Kizou
Assistant Examiner—Joe Logsdon
(74) Attorney, Agent, or Firm—Leonard C. Suchyta, Esq.; Harrity & Snyder L.L.P.

(57) ABSTRACT

A multi-line telephony system and method deliver multiple concurrent telephone conversations to a customer premise via a single traditional twisted-pair communications connection, and support telephone services via a traditional dial-up connection. Improved packet-based communications are performed using the multi-line telephony system and method with better transmission characteristics, such as transmission speed, over traditional twisted-pair wire connections to provide H.323-based network

19 Claims, 4 Drawing Sheets

MULTI-LINE TELEPHONY VIA NETWORK GATEWAYS

RELATED APPLICATIONS FILED CONCURRENTLY HEREWITH

This invention is related to the following inventions, all of which are filed concurrently herewith and assigned to the assignee of the rights in the present invention: Ser. No. 60/105,326 of Gardell et al. entitled "A HIGH SPEED COMMUNICATIONS SYSTEM OPERATING OVER A COMPUTER NETWORK"; Ser. No. 09/178,810 of Gardell et al. entitled "NETWORK PRESENCE FOR A COMMUNICATIONS SYSTEM OPERATING OVER A COMPUTER NETWORK"; Ser. No. 09/178,810 of Gardell at al. entitled "SPEAKER IDENTIFIER FOR MULTI-PARTY CONFERENCE"; Ser. No. 09/178,178 of Gardell et al. entitled "SYSTEM PROVIDING INTEGRATED SERVICES OVER A COMPUTER NETWORK"; Ser. No. 09/177,415 of Gardell et al. entitled "REAL-TIME VOICE-MAIL MONITORING AND CALL CONTROL"; and Ser. No. 09/177,700 of Gardell et al. entitled "MULTI-LINE APPEARANCE TELEPHONY VIA A COMPUTER NETWORK".

BACKGROUND OF THE INVENTION

1. Field of the Invention

This invention relates generally to the field of telephony, and in particular to multi-line telephony over computer networks such as the Internet.

2. Description of Related Art

Traditional communications systems, such as the Public Switched Telephone Network (PSTN), are being combined with digital communications systems. Networks, such as the Internet, have become pervasive, with Internet telephony having been developed for transmitting voice signals via packets.

Internet telephone systems have their own protocols to transfer digital data at an improved rate of speed with adequate clarity. PSTN telephone lines have become overloaded with information and have not been able to provide reliable, cost-efficient service for the simultaneous transmission of data and voice.

The H.323 standard is an International Telecommunications Union (ITU) standard for packet-based voice and video communications over computer networks, such as local area networks (LANs) and the Internet. ITU Recommendation H.323 describes terminals and equipment which provide this multimedia communications service over packet-based networks (PBN), but which may not provide guaranteed Quality of Service (GQOS), for example, for audio applications. H.323 terminals and equipment may carry real-time audio, video and/or data. According to the standard, support for audio is mandatory, but support for data and video is optional. If data and video transmissions are supported, the ability to use a specified common mode of operation is required, so that all terminals supporting a common type of media may interact and work together.

The packet-based network over which H.323 terminals communicate may implement a point-to-point connection, a single network segment, or a complex network having multiple segments with complex topologies. H.323 terminals may communicate with terminals defined by other standards, e.g., H.310 terminals on a broadband integrated service digital network (B-ISDN), H.320 terminals on a narrowband integrated services digital network (N-ISDN), H.321 terminals on B-ISDN, H.322 terminals on GQOS LANs, H.324 terminals on general switched telephone networks (GSTNs) and wireless networks, V.70 terminals on GSTNs, and voice terminals on GSTNs or ISDNs through the use of gateways. H.323 terminals may be integrated into personal computers or implemented in stand-alone devices, such as video telephones.

A need exists for a network which moves data faster than the conventional PSTN, and provides more real-time response, better quality of service (QOS), and better transmissions. It would be advantageous for such a network to interact and provide a liaison with a PSTN to facilitate functions within the network as well as to provide improved functionality over the current telephone communication system. Such a system is described in co-pending U.S. patent application Ser. No. 60/105,320 (Attorney Docket Number 98-808) of Gardell et al. entitled "A HIGH SPEED COMMUNICATIONS SYSTEM OPERATING OVER A COMPUTER NETWORK", and filed concurrently herewith, the disclosure of which is incorporated herein by reference.

A need also exists for a network capable of increasing transmission of telephone data up to 30 or 40 phone conversations on a single wire.

Heretofore, H.323-based networks have been implemented by connecting such terminals through conventional telephone lines of the PSTN, which is thus limited by the bandwidth and performance characteristics of the PSTN. A need exists for implementing an H.323-based network over faster communication channels using, for example, interface equipment and protocols for connecting H.323 terminals over high speed communication channels, such as Internet-based systems.

SUMMARY OF THE INVENTION

It is one aspect of our invention that improved packet-based communications may be achieved for performing multi-line telephony with better transmission characteristics, such as enhanced transmission speed, over traditional twisted-pair wire connections to provide H.323-based network operations. Utilizing digital subscriber line access multiplexer technology, the present invention is capable of maintaining multiple, concurrent, independent telephone calls over a single telephone line. The invention connects two or more callers to a single end-point and multiplexes data packets from the two or more callers to the receiving end-point. With the high transmission rates provided by ADSL technology, the voice data from multiple callers can be delivered to the end-point over a single subscriber line.

In accordance with our invention, a multi-line telephony system includes software and hardware to provide the ability to deliver multiple concurrent telephone conversations to a customer premises via a single traditional twisted-pair communications connection, and also to support telephone services via a traditional dial-up connection. The system includes a point-of-presence entity which is programmed to effect a simultaneous connection between the customer premises and at least two other connecting telephone devices, utilizing packet-based technology and ADSL transmission rates.

BRIEF DESCRIPTION OF THE DRAWINGS

The features and advantages of the disclosed multi-line telephony system and method are readily apparent and are to be understood by referring to the following detailed description of the preferred embodiments of the present invention, taken in conjunction with the accompanying drawings, in which.

DESCRIPTION OF THE PREFERRED EMBODIMENTS

Figure 1:
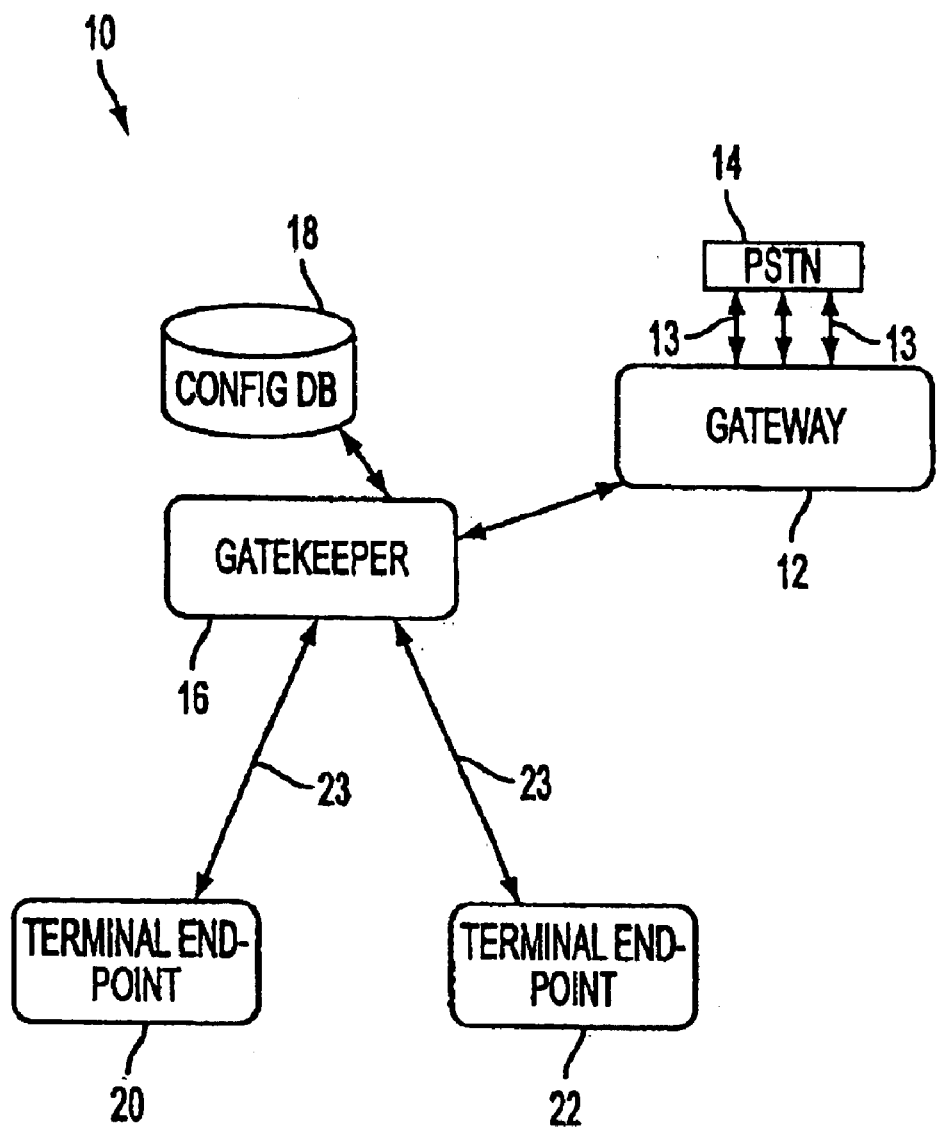
FIG. 1 illustrates an overall schematic of a specific illustrative embodiment of a multi-line telephony system in accordance with this invention.

Referring in specific detail to the drawings, and in particular to FIG. 1, the disclosed embodiment of the present invention comprises a multi-line telephony system 10 and method implemented using asymmetric digital subscriber line (ADSL) technology and the H.323 standard for delivering multiple concurrent telephone conversations to a customer premises via a single traditional twisted-pair connection, such as copper wires. The system utilizes the packet-based nature of the transmission of voice data through the system 10 to multiplex the voice data from two or more conversations to the customer premises, as described in greater detail below.

As shown in FIG. 1, the multi-line telephony system 10 includes at least one gateway 12 which complies with the H.323 standard for establishing connections 13 to a PSTN 14. Such connections 13 may be twisted pairs of wires, such as copper wires. Alternative embodiments of the connections to the PSTN 14 may include fiber optic connections, as well as other high speed communications, such as integrated services digital network (ISDN) connections and/or dedicated T1 lines.

A gatekeeper 16 is connected to the gateway 12, as well as to a subscriber registration database and/or configuration database (ConfigDB) 18, for controlling communications with a plurality of terminal end-points 20, 22, which are connected to the gatekeeper 16 through at least a single twisted-pair wire connection 23.

Each of the terminal end-points 20, 22 includes an H.323 terminal having, for example, a graphical user interface (GUI) for placing and receiving telephone calls. Network-based facilities are provided in the multi-line telephony system 10 which manage the interaction of the terminal endpoints 20, 22 with the PSTN 14.

In particular, the terminal end-points 20, 22 are communications devices which use ADSL technology over twisted-pair connections 23 for transporting packet-based voice communications through the system 10 and to the PSTN 14, or to other terminal end-points 20, 22.

As is well known to those of ordinary skill in the art, ADSL provides a conventional voice communications channel, as well as a low speed upstream channel and a high speed downstream channel. Thus, ADSL provides relatively high transmission rates. This allows the present invention to utilize packet-based transmission of data to support multiple concurrent phone conversations over a single line.

Figure 2:
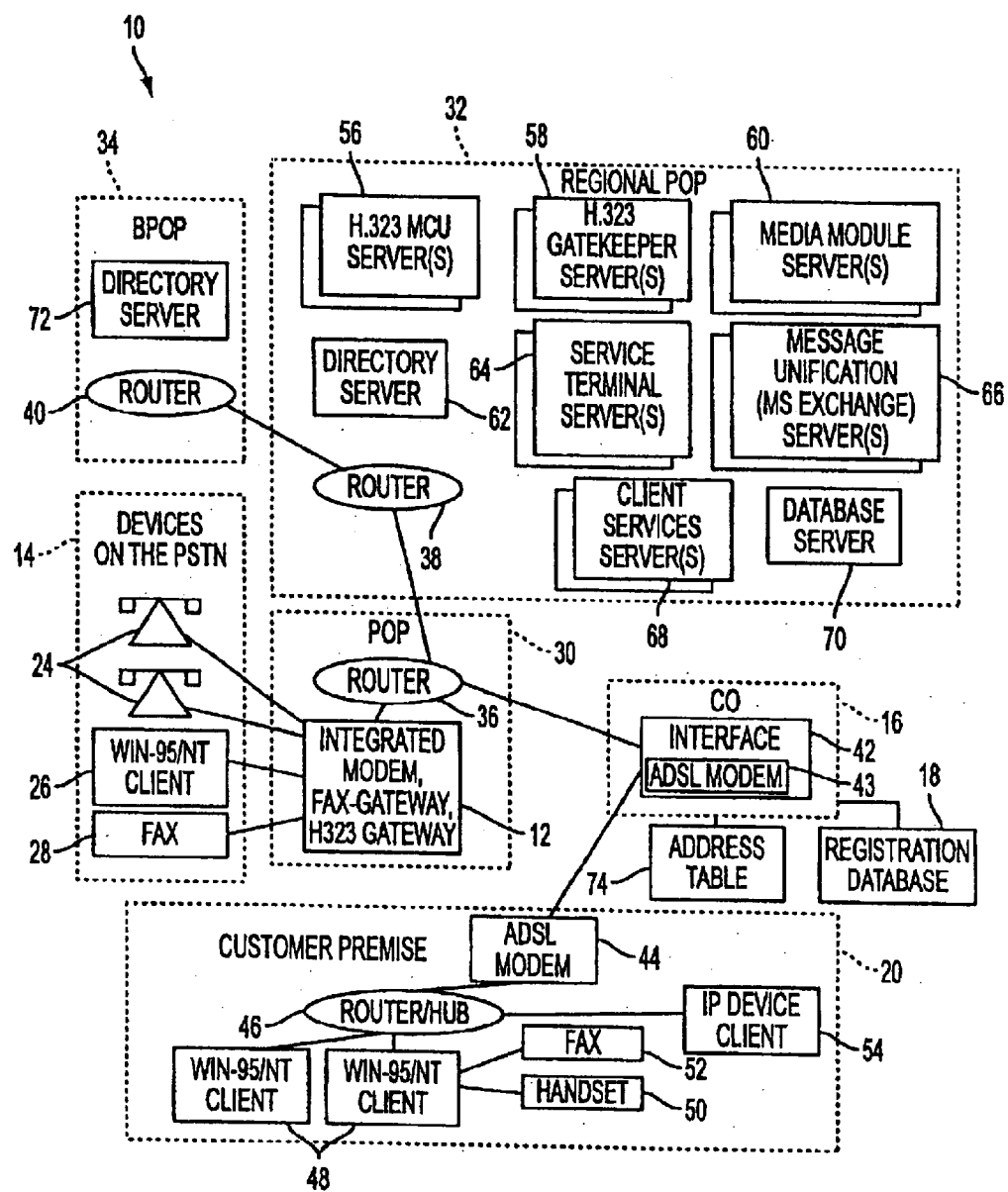
FIG. 2 illustrates the multi-line telephony system of FIG. 1 in greater detail.

The multi-line telephony system 10 of FIG. 1 is shown in greater detail in FIG. 2. The PSTN 14 includes and/or is connected to a plurality of devices on the PSTN 14, such as A- individual telephone devices 24, a "WINDOWS 95" -based and/or a "WINDOWS NT"-based client (WIN-95/NT Client) 26, and a facsimile (FAX) device 28. Each of the PSTN devices 24–28 are connected to the gateway 12 through the respective connections 13. The gateway may comprise an integrated modem, a Fax-Gateway, and a H.323 Gateway combination. The gateway 12 may be a component of a Point-of-Presence (POP) device included in the system 10, such as a low-level POP 30. In one illustrative embodiment, the system 10 is in the form of a hierarchical network, as described in greater detail in copending U.S. patent application Ser. No. 60/105,326 (Attorney Docket Number 98-808) of Gardell et al. entitled "A HIGH SPEED COMMUNICATIONS SYSTEM OPERATING OVER A COMPUTER NETWORK", filed concurrently herewith, and which has been incorporated herein by reference.

The multi-line telephony system 10 has a plurality of Point-of-Presence sites, such as the low-level POP 30, a regional POP (RPOP) 32, and a backbone POP (BPOP) 34. The low-level POP 30, RPOP 32, and BPOP 34 are entities which are arranged in a hierarchy for interacting with the PSTN 14 at a switched circuit level through the gateway, with the gateway 12 housed at a suitable POP.

Each of the POPs 30, 32, and 34 includes respective routers 36, 38, 40 for establishing circuit pathways from the terminal end-points 20 and 22 of various subscribers to the network, through respective central offices 16 (CO), which serve as the gatekeepers of the system 10, to the rest of the network forming the multi-line telephony system 10.

In the hierarchy of the multi-line telephony system 10, there may be, for example, about one thousand COs 16, about three hundred low-level POPs 30, about forty RPOPs 32, about twelve BPOPs 34, and about four data centers. Each of the COs 16 may handle about five thousand terminal end-points 20 and 22. In turn, each of the low-level POPs 30 may handle about seventeen thousand subscribers, each of the RPOPs 32 may handle about one quarter of a million subscribers, and each of the BPOPs 34 may handle about one half of a million subscribers. Accordingly, the data centers may each handle 1.25 million subscribers such that the total subscriber base of the disclosed multi-line telephony system 10 may be about five million subscribers.

In particular, the central offices provide services to interact directly with the local loops through an interface 42 in each central office 16. The interface 42 advantageously comprises one or more of a digital subscriber lines access multiplex hardware device, an ADSL modem bank 43, and an Ethernet device such as an Ethernet Concentrator and an Ethernet Router. As shown in FIG. 2, in the disclosed multi-line telephone system 10, the interface 42 is connected to the router 36 of the low-level POP 30 and to the ADSL modem 44 of the terminal end-point 20, which is a customer premises device.

Referring to FIG. 2, each of the terminal end-points 20 includes the ADSL modem 44 as well as a router/hub device 46 for connecting the ADSL modem 44 to, for example, WIN-95/NT clients 48, a telephone handset 50, a facsimile device 52, and/or an Internet Protocol (IP) device client 54.

Each RPOP 32 includes the router 38 as well as an H.323 multipoint control unit (MCU) server 56, an H.323 Gatekeeper Server 58, a media module server 60, a directory server 62, a service terminal server 64, a message unification server 66, a client services server 68, and a database server 70. In particular, the H.323 MCU server 56 is an H.323-based multi-party conference call unit, which may include digital signal processing (DSP) components for audio and/or video conference call processing.

The H.323 Gatekeeper Server 58 is a dedicated server for controlling gatekeeper functions as defined by the H.323 standard. In addition, other gatekeeper functions may be performed by using, for example, a Cisco H.323 gatekeeper unit as the H.323 Gatekeeper Server 58. The media module server 60 provides DSP support and media storage using, for example, a "WINDOWS NT"-based computer and telephony cards such as those manufactured by the Dialogic Cororation.

The directory server 62 is a dedicated computer for providing Lightweight Directory Access Protocol (LDAP)-based directory services. The service terminal server 64 is a dedicated computer for operating at least one service terminal, for example, to provide services such as auto-attendant functions, music-on-hold operations, voice mail recording facilities, etc.

The message unification server 66 manages messages including E-mail, using, for example, "MICROSOFT EXCHANGE" to ensure conversion and compatibility of message formats. The client services server 68 manages interactions with the various client components such as WIN-95/NT clients 26, 48. The database server 70 maintains persistent private branch exchange (PBX) profiles and user profiles, and also stores persistent data such as billing records pertaining to the disclosed multi-line telephony system 10 in a database. The database server 70 may be, for example, a UNIX-based computer.

The BPOP 34 includes the router 40 and may also include a directory server 72 for providing LDAP-based directory services, in conjunction with the low-level POP 30 and the RPOP 32, to the data centers for processing calls throughout the multi-line telephony system 10.

ESTABLISHING CONNECTIONS FROM GATEKEEPERS TO GATEWAYS

The POPs 30, 32, and 34 contact central offices 16 that act as gateways which are characterized by their addressing semantics to support H.323 connections to addresses which are not explicitly managed by their interface 42 through information in a registration database 18. For example, when a call is made from end point 20, it is directed to central office 16. Based on, the information in the database 18 and address table 74, the call is directed to POP 30. The gateway 12 of POP 30 then connects the call to the PSTN 14. Accordingly, the gateway 12 supports a number of PSTN telephone numbers. Generally, an entire set of E.164 addresses may be available to establish direct connections with any directly dialable telephone, including through global telephone connections. The E.164 addresses are determined according to the ITU-T Recommendation E.164 (1991) entitled "Numbering Plan for the ISDN Era".

Each gateway 12 is registered with the central office 16 as a single H.323 end-point for communication paths. The central office operates in this system as a gatekeeper and can be referred to as such. Since the H.323 standard does not establish how gatekeepers route calls to the gateways, the disclosed multi-line telephony system 10 routes calls using a mapping determining each E.164 address to a particular central office 16. At each central office gatekeeper 16, an address table 74 is stored in a memory which uses a predetermined numbering plan to map the E.164 addresses to a particular gateway 12.

When the H.323-based terminal end-point 20 queries the gatekeeper of central office 16 for a name/address of a specific destination to complete a connection to establish a call, the terminal end-point 20 sends an Admission Request message or query (ARQ) to the gatekeeper 16. The gatekeeper 16 accesses the address table 74 to determine the appropriate transport address and/or IP address to allow a call to reach its destination, and the gatekeeper 16 provides the retrieved address to the terminal end-point 20.

Alternatively, the disclosed multi-line telephony system 10 may include proxy devices which act as interfaces between the gatekeeper 16 and a quality of service (QoS) network, which may be a private network for communicating with the multi-line telephony system 10. For example, a proxy may communicate with the QoS network through a firewall. Accordingly, upon receiving an ARQ, the gatekeeper 16 determines the IP address of the appropriate proxy to allow the requesting terminal end-point 20 to communicate with the QoS network through the proxy.

Figure 3:
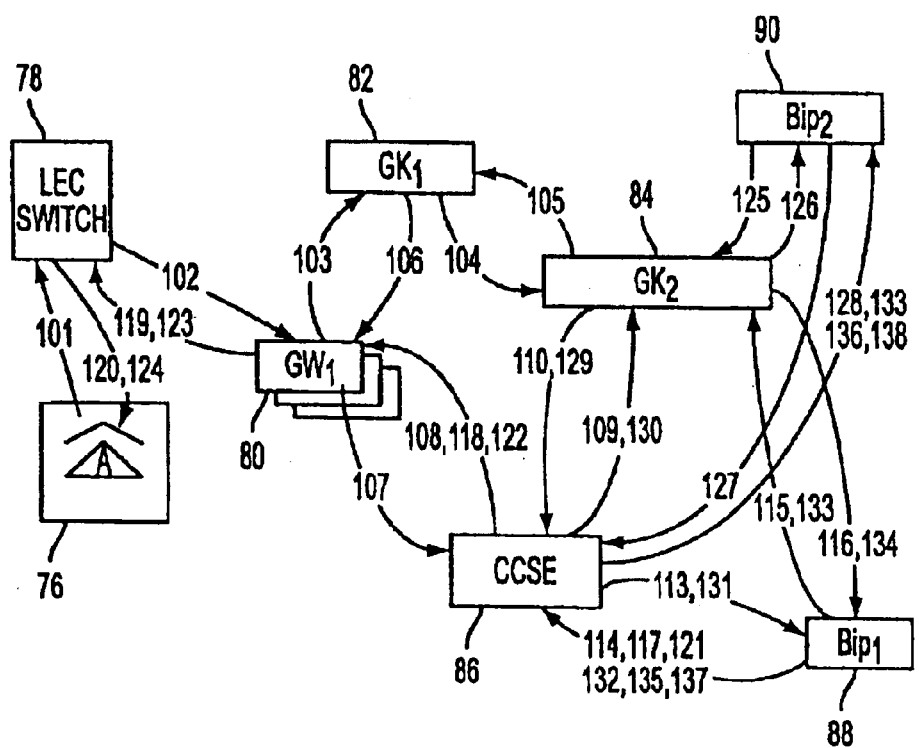
FIG. 3 is a state diagram of the operation of the multi-line telephony system of FIGS. 1–2.

As shown in the state diagram in FIG. 3, the multi-line telephony system 10 operates to connect multiple caller telephone devices to a specific called telephone device at a customer premises. For example, a first caller telephone 76, such as a traditional telephone labeled A, connects through a local exchange carrier (LEC) switch 78, which is a component of the PSTN 14, to a gateway 80, labeled $GW_1$. By appropriate signaling described below, the gateway 80; a first gatekeeper 82, labeled $GK_1$; a second gatekeeper 84, labeled $GK_2$; and a call control service entity (CCSE) 86 establish a connection between the first caller telephone 76 and other telephone devices. In particular, a second telephone device 88 may be, for example, an IP-based telephone capable of Internet telephony, and so is labeled $Bip_1$.

Using the disclosed multi-line telephone system 10, another telephone device 90, such as an IP-based telephone labeled $Bip_2$, may simultaneously and/or concurrently with phone 76 establish a connection through appropriate signaling between $Bip_2$ 90, the CCSE 86, and the second gatekeeper 84, to the second telephone device $Bip_1$ 88. In this manner, a conference call between the three parties can be established. The voice data from the phone 76 and $Bip_2$ 90 are transmitted in multiplexed packets from the respective gatekeepers 82 and 84 to $Bip_1$ 88. By using an ADSL line, sufficient data may be passed to support two or more simultaneous calls over the single line. The two gatekeepers are programmed to coordinate the delivery of voice data packets from the respective calling parties to the called party $Bip_1$. For example, upon initiating a conference call between the three parties, the CCSE can transmit control signals to each of the gatekeepers such that only one gatekeeper is transmitting a data packet at any given time to $Bip_1$. In one simplified embodiment, the first gatekeeper 82 transmits the first data packet to $Bip_1$, the second gatekeeper 84 transmits the second data packet to $Bip_1$, and so on. Other schemes are also suitable, as will be understood by those skilled in the art.

Each gatekeeper 82, 84 corresponds to a respective telephone device 76, 90 for providing the connections to the called telephone device 88. For example, the corresponding gatekeeper of a respective telephone device may be relatively proximate in communication links to the respective telephone devices, for example, by relatively short twisted-pair connections. The CCSE 86 is an H.323-based POP entity which routes H.323 call control signals to provide an initial connection and/or connection set-up configuration between an incoming call and the intended end-point or registered service as the called telephone device. The CCSE 86 responds to call control events which occur during the course of the initial call placement, and so may re-direct the call path according to the service profile of a subscriber. The CCSE 86 is responsible for attempting to connect a caller to a target address, such as the IP address of the telephone devices 88, 90, and the CCSE 86 routes call control signals.

As a POP entity, the CCSE 86 is capable of performing the sub-addressing to gatekeepers 82, 84, as described above for the POPs 30, 32, and 34. The CCSE 86 may be incorporated into one or more POPs 30, 32, and 34, and in particular may handle all calls which originate or terminate at public end-points. Accordingly, the CCSE 86 may be used for intelligent routing of selected calls, for example, to control the interactions between the gateway 12 and the PSTN 14 in FIG. 1. In addition, intelligent functions, such as automatically re-directing calls upon specific conditions, may be performed. For example, when a telephone device is engaged in two concurrent calls and is configured by stored user configuration information to handle only two line appearances, a third incoming call may be automatically shunted to a voice-mail system. In addition, the CCSE is preferably programmed to control the gatekeepers 82 and 84 to coordinate multiplexing data packets from the gatekeepers to $Bip_1$, as described above.

It is to be understood that the operation of the disclosed multi-line telephone system 10 using the components shown in FIG. 3 is an illustrative embodiment, and so operates in a similar manner to connect various combinations of at least one traditional telephone 76 through at least one LEC switch 78, as well as at least one IP-based telephone such as devices 88, 90, in various configurations of gateways 80 and gatekeepers 82, 84.

OPERATION OF THE MULTI-LINE TELEPHONY SYSTEM

Figure 4:
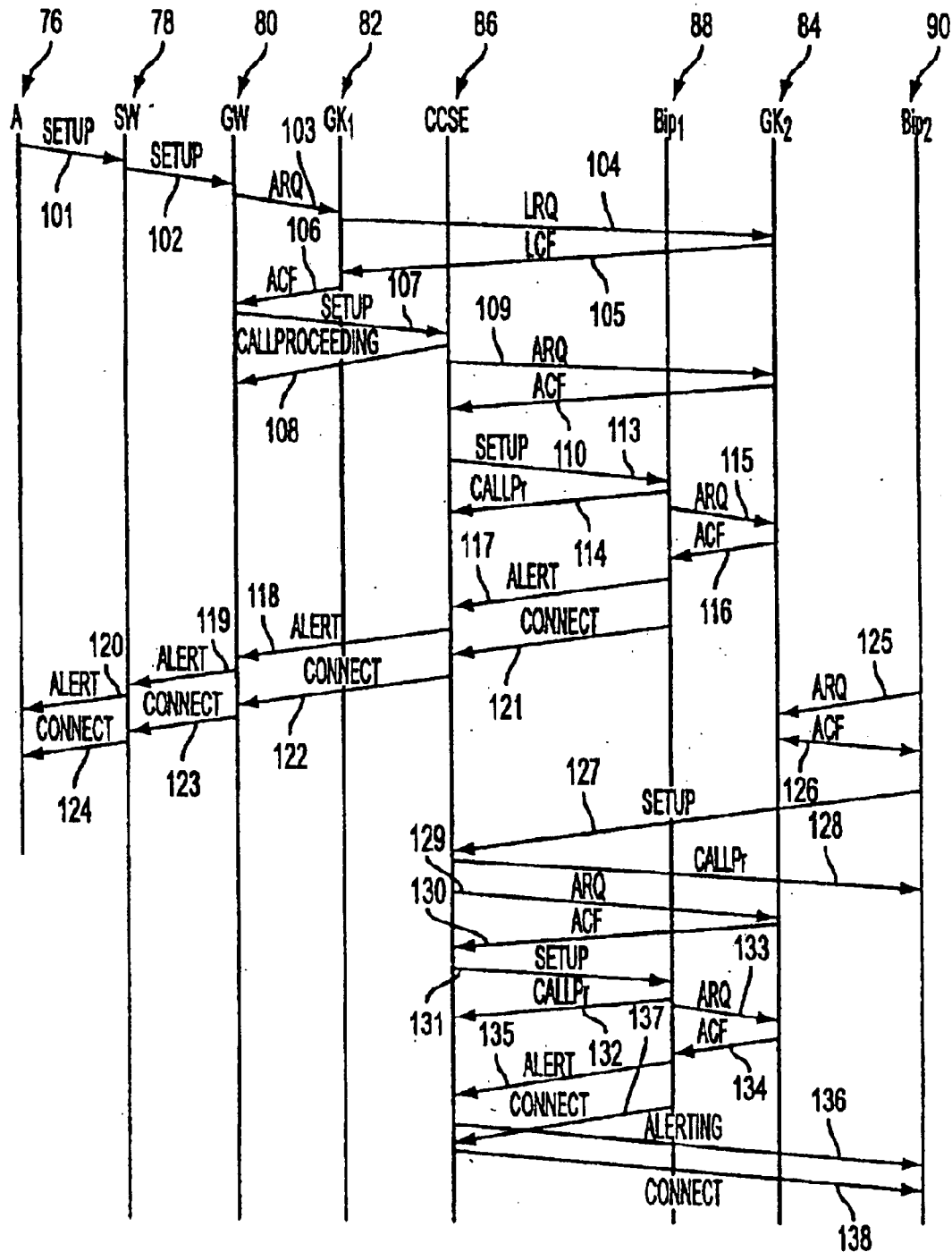
FIG. 4 is a flow diagram of the operation of the multi-line telephony system of FIGS. 1–2.

Referring to FIG. 4 in conjunction with FIG. 3, the first telephone device 76, labeled A, issues a SETUP signal in step 101 to the LEC switch 78, labeled SW in FIG. 4, which in turn routes the SETUP signal to the gateway 80. The SETUP signal is generated by the first telephone device 76 to establish a connection to the called telephone device 88. In response to the SETUP signal, the gateway 80 generates an admission request (ARQ) signal, which is sent in step 103 to the first gatekeeper 82.

In response, the first gatekeeper 82 generates a location request (LRQ) signal to be sent in step 104 to the second gatekeeper 84 to determine the address for the calling telephone device 76. Such an LRQ signal may be broadcast to any available gatekeepers in the multi-line telephony system 10 to ascertain an appropriate gatekeeper, for example, which is relatively proximate to the called telephone device 88 ($Bip_1$).

Upon determining that $Bip_1$ is available for connection through the second gatekeeper 84, the second gatekeeper 84 generates a location confirmation (LCF) signal, which is sent in step 105 to the first gatekeeper 82. The LCF signal may also include the address of the second gatekeeper 82 for use in routing the call therethrough.

In response to the LCF signal, the first gatekeeper 82 generates an admission confirmation (ACF) signal which is sent in step 106 to the gateway 80, which in turn transmits the SETUP signal to the CCSE 86 in step 107 to control the initial connection procedures between the telephone devices 76, 88.

The CCSE 86 then generates a CALLPROCEEDING status signal, which is sent to the gateway 80 in step 108 to indicate that the call connection is being initially established. The CCSE 86 also transmits an ARQ signal to the second gatekeeper 84 in step 109 to request admission to connect the telephone devices 76, 88. The second gatekeeper 84 in turn determines whether a connection may be made, and if so generates an ACF signal which is transmitted to the CCSE 86 in step 110.

In response to the ACF signal from the second gatekeeper 84, the CCSE 86 transmits the SETUP signal to the second telephone device 88 in step 113, which in turn transmits a CALLPROCEEDING (CallPr) signal in step 114 to the CCSE 86 to indicate that the call connection is being established. For illustrative purposes, the second telephone device 88 is an IP-based telephone.

In addition, the second telephone device 88 generates and transmits an ARQ signal to the second gatekeeper 84 in step 115 to obtain permission to establish the call with the first telephone device 76. After receiving an ACF signal from the second gatekeeper 84 in step 116, the second telephone device 88 then generates an ALERT signal to indicate that a call connection is being established with the second telephone device 88, and generates a CONNECT signal to finally establish the call connection to the second telephone device 88. The ALERT signal is then transmitted through the CCSE 86, through the gateway 80, and through the LEC switch 78 to the first telephone device 76 in steps 117–120, respectively. The first telephone device 76 responds to the ALERT signal by initializing appropriate connection protocols for the connecting call.

The CONNECT signal is then transmitted through the CCSE 86, through the gateway 80, and through the LEC switch 78 to the first telephone device 76 in steps 121–124, respectively. The first telephone device 76 responds to the CONNECT signal by performing the appropriate connection protocols for the connecting call, and so the call connection between the telephone devices 76, 88 is established.

Independently, a third telephone device 90, which in this illustration is taken to be an IP-based telephone device, initiates a call connection with the second telephone device 88 by generating an ARQ signal which is sent to the second gatekeeper 84 in step 125. The ARQ signal alternatively may be broadcast to all of the gatekeepers. In response, the second gatekeeper 84, after determining itself to be the appropriate gatekeeper for establishing the connection with the second telephone device 88, sends an ACF signal to the third telephone device 90 in step 126. The ACF signal may also include an address to assist the third telephone device 90 to properly route the call to the second telephone device 88.

The third telephone device 90 then sends a SETUP signal to the CCSE 86 in step 127 to request the CCSE 86 to perform the initial connection to the second telephone device 90. In response, the CCSE 86 sends a CALLPROCEEDING signal to the third telephone device 90 in step 128 to indicate that the connection is being established.

Concurrently or simultaneously-with step 128, the CCSE 86 sends an ARQ signal to the second gatekeeper 84 in step 129 to request admission and establishment of the connection. The second gatekeeper 84 then sends an ACF signal to the CCSE 86 in step 130 to confirm that the connection may be established to the second telephone device 88.

The CCSE 86 then sends the SETUP signal to the second telephone device 88 in step 131 to control the establishment of the connection. The second telephone device 88 responds to the SETUP signal by sending a CALLPROCEEDING (CallPr) signal to the CCSE 86 in step 132 to indicate that the connection is being established. Concurrently or simultaneously, the second telephone device 88 sends an ARQ signal to the second gatekeeper 84 in step 133 to request admission of the connection between the telephone devices 88, 90. The second gatekeeper 84 transmits an ACF signal in step 134 to the second telephone device 88 to confirm that the connection may be established.

After receiving an ACF signal from the second gatekeeper 84 in step 134, the second w telephone device 88 then generates an ALERT signal to indicate that a call connection is being established with the third telephone device 90, and generates a CONNECT signal to finally establish the call connection to the third telephone device 90. The ALERT signal is then transmitted through the CCSE 86 to the third telephone device 90 in steps 135–136, respectively. The third telephone device 90 responds to the ALERT signal to initialize appropriate connection protocols, such as H.323-based IP telephony protocols, for the connecting call.

The CONNECT signal is then transmitted through the CCSE 86 to the third telephone device 90 in steps 137–138, respectively. The third telephone device 90 responds to the CONNECT signal by performing the appropriate connection protocols, such as H.323-based IP telephony protocols for the connecting call, and so the call connection between the telephone devices 88, 90 is established. The gatekeepers are then controlled by the CCSE to multiplex the voice data packets to $Bip_1$ according to any suitable procedure.

As stated above, steps 101–124 may be performed independently from step 125–138, in which steps 101–124 are performed for connecting a traditional telephone device 76 to an IP-based telephone device 88, and steps 125–138 are performed for connecting two IP-based telephone devices, such as devices 88, 90.

Accordingly, a plurality of terminal end-points 20, 22 may be connected via a twisted-pair of lines eventually to the gatekeeper 16 and other network elements. For example, 30 to 40 call appearances may be handled, with the terminal end-points conducting two or more active calls of such 30 to 40 call appearances.

While the multi-line telephony system 10 and method of the present invention are particularly shown and described herein with reference to the preferred embodiments, it is to be understood that various modifications in form and detail may be made without departing from the scope and spirit of the present invention. For example, other communication mechanisms may be incorporated into the multi-line telephony system 10, such as ISDN and T1 connections, as well as digital subscriber loop (DSL) technologies. Corresponding modems, communication interfaces, and protocols may be supported in POPs 30, 32, and 34 as well as the interface 42 of the CO 16.

Accordingly, modifications, such as any examples suggested herein, but not limited thereto, are to be considered within the scope of the present invention.

What is claimed is:

1. A communication system for providing call connections to at least one customer telephone device from plural connecting telephone devices, the communication system comprising:

at least one gatekeeper for processing calls directed to the customer telephone device; and a point-of-presence entity programmed to provide and control a simultaneous connection between the customer telephone device and at least two of the connecting telephone devices, the entity being programmed to control the at least one gatekeeper to transmit multiplexed voice data packets from the connecting telephone devices to the customer telephone device, wherein the gatekeeper connects to the customer device by a twisted-pair connection, and wherein the at least one customer device includes a plurality of customer devices that connect to a respective gatekeeper by a single pair of copper wires as the respective twisted-pair connection.

2. The communication system of claim 1 wherein each of the customer devices includes an H.323-based device and a respective asymmetric digital subscriber line (ADSL) modem for connecting the respective H.323-based customer device with a plurality of concurrent voice connections.

3. The communication system of claim 2 wherein the gatekeeper includes:

an ADSL modem for connecting to the ADSL modems of the customer devices.

4. A communication system for providing call connections to at least one customer telephone device from plural connecting telephone devices, the communication system comprising:

at least one gatekeeper for processing calls directed to the customer telephone device;

a point-of-presence entity programmed to provide and control a simultaneous connection between the customer telephone device and at least two of the connecting telephone devices, the entity being programmed to control the at least one gatekeeper to transmit multiplexed voice data packets from the connecting telephone devices to the customer telephone device; and a plurality of point-of-presence entities, each including at least one gateway for interacting with a public switched telephone network at a switched circuit level to process the calls directed to the customer device.

5. A communication system for providing call connections to at least one customer telephone device from plural connecting telephone devices, the communication system comprising:

at least one gatekeeper for processing calls directed to the customer telephone device; and a point-of-presence entity programmed to provide and control a simultaneous connection between the customer telephone device and at least two of the connecting telephone devices, the entity being programmed to control the at least one gatekeeper to transmit multiplexed voice data packets from the connecting telephone devices to the customer telephone device, wherein each of the at least two connecting devices includes at least one of public switched telephone network (PSTN)-based telephone devices and H.323-based telephone devices.

6. A multi-line telephony system including at least one customer telephone device having an asymmetric digital subscriber line (ADSL) modem for communicating packetized voice signals and a plurality of public switched telephone network (PSTN)-based telephone devices connected to a PSTN, the system comprising:

a plurality of point-of-presence (POP) entities, each POP entity including a router for establishing switched circuit pathways, at least one POP entity including a gateway for processing calls to and from the PSTN; and a central office including:

an interface including an ADSL modem connected to a respective one of the ADSL modems of the customer telephone devices by a respective single twisted-pair connection, the interface configured to connect multiple concurrent telephone calls to a single customer telephone device.

7. The multi-line telephony system of claim 6 further comprising:

a gatekeeper device disposed in said central office, each of the customer telephone devices connecting to the gatekeeper device by a single pair of copper wires as the respective twisted-pair connection.

8. The multi-line telephony system of claim 6 wherein the central office includes an Ethernet device for connection to the gateway.

9. The multi-line telephony system of claim 6 wherein at least one of the POP entities includes a call control service entity for providing and controlling an initial concurrent connection between a pair of connecting telephone devices.

10. The multi-line telephony system of claim 9 wherein each of the pair of connecting telephone devices includes at least one of PSTN-based telephone devices and the customer telephone devices.

11. The multi-line telephony system of claim 6 wherein at least one of the POP entities interacts with the PSTN at a switched circuit level.

12. The multi-line telephony system of claim 6 wherein said plurality of POP entities are arranged in a predetermined hierarchy and including:

at least one low-level POP entity connected to at least one central office; and at least one regional POP entity connected to the at least one low-level POP entity.

13. A method of providing multi-line telephony in a packet-based network, comprising:

initiating a plurality of call connections from a plurality of calling telephone devices to a single called telephone device;

establishing the call connections concurrently between each of the plurality of calling telephone devices and the called telephone device over a single line; and transmitting in a multiplexed manner voice data packets from the calling telephone devices to the called telephone device over the single line, wherein the initiating a plurality of call connections includes:

initiating a call connection from a public switched telephone network (PSTN)-based telephone device, and sending a SETUP signal through a PSTN switch to an H.323-based gateway.

14. A method of providing multi-line telephony in a packet-based network, comprising:

initiating a plurality of call connections from a plurality of calling telephone devices to a single called telephone device;

establishing the call connections concurrently between each of the plurality of calling telephone devices and the called telephone device over a single line; and transmitting in a multiplexed manner voice data packets from the calling telephone devices to the called telephone device over the single line, wherein the initiating a plurality of call connections includes:

sending an admission request (ARQ) signal from an H.323-based telephone device to an H.323-based gatekeeper.

15. The method of claim 14, further including:

sending an ARQ signal over a single twisted-pair connection between respective asymmetric digital subscriber line (ADSL) modems of the H.323-based telephone device and the H.323-based gatekeeper.

16. A central office connected between a gateway and at least one telephone device in a packet-based network, comprising:

a memory configured to store data for mapping addresses of incoming calls to an address of the gateway; and an interface configured to multiplex voice data corresponding to concurrent ones of the incoming calls and transmit the multiplexed voice data to the telephone device over a single line.

17. The central office of claim 16, wherein the interface includes:

an asymmetric digital subscriber line modem configured to communicate packetized voice data with the terminal end-point.

18. A system, comprising:

a first telephone device;

a first gatekeeper coupled to the first telephone device and configured to receive first voice data packets therefrom;

a second telephone device;

a second gatekeeper coupled to the second telephone device and configured to receive second voice data packets therefrom;

a third telephone device coupled to the first and second gatekeepers by an ADSL line; and a call control service entity coupled to the first and second gatekeepers and configured to set up simultaneous calls from the first and second telephone devices to the third telephone device and to control the first and second gatekeepers such that only one gatekeeper at a time is transmitting voice data packets to the third telephone device.

19. The system of claim 18, wherein the first and second gatekeepers alternately transmit first and second voice data packets to the third telephone.

* * * * *